(12) United States Patent
Honda et al.

(10) Patent No.: US 7,035,054 B2
(45) Date of Patent: Apr. 25, 2006

(54) MAGNETIC HEAD APPARATUS, MAGNETIC HEAD SUPPORTING MECHANISM AND MAGNETIC RECORDING APPARATUS HAVING AN IMPROVED IMPACT RESISTANCE

(75) Inventors: Takashi Honda, Tokyo (JP); Katsuki Kurihara, Tokyo (JP); Yoshihiro Ueno, Osaka (JP); Hideki Kuwajima, Kyoto (JP)

(73) Assignees: TDK Corporation, Tokyo (JP); Matsushita Electric Industrial Co., Ltd., Kadoma (JP)

( * ) Notice: Subject to any disclaimer, the term of this patent is extended or adjusted under 35 U.S.C. 154(b) by 140 days.

(21) Appl. No.: 10/606,787

(22) Filed: Jun. 27, 2003

(65) Prior Publication Data

US 2004/0090710 A1    May 13, 2004

(30) Foreign Application Priority Data

Jun. 28, 2002  (JP) .............................. 2002-190343

(51) Int. Cl.
G11B 5/55  (2006.01)
G11B 21/08 (2006.01)
G11B 5/48  (2006.01)
G11B 21/16 (2006.01)

(52) U.S. Cl. ............................... 360/265.9; 360/244.4; 360/244.5; 360/244.8; 360/245.2

(58) Field of Classification Search ............ 360/265.9, 360/244.4, 244.7, 244.5, 244.8, 245.2, 244.2
See application file for complete search history.

(56) References Cited

U.S. PATENT DOCUMENTS

| 5,012,369 | A | * | 4/1991 | Owe et al. .............. 360/244.5 |
| 5,255,135 | A | * | 10/1993 | Itoh et al. .................. 360/75 |
| 5,477,404 | A | * | 12/1995 | Kozaki .................. 360/246.3 |
| 5,640,290 | A |   | 6/1997 | Khanna et al. |
| 5,901,017 | A |   | 5/1999 | Sano et al. |
| 5,936,803 | A | * | 8/1999 | Berding .................. 360/244.8 |
| 6,016,239 | A |   | 1/2000 | Mizuno et al. |
| 6,215,626 | B1 |   | 4/2001 | Kajitani .................. 360/245.1 |
| 6,751,064 | B1 | * | 6/2004 | Kuwajima et al. ....... 360/265.9 |
| 6,826,018 | B1 | * | 11/2004 | Kuwajima et al. ....... 360/254.3 |

FOREIGN PATENT DOCUMENTS

| EP | 0 342 625 | 11/1989 |
| JP | 8-102159 | 4/1996 |
| JP | 9-82052 | 3/1997 |
| JP | 2001-57032 | 2/2001 |

* cited by examiner

*Primary Examiner*—Craig A. Renner
(74) *Attorney, Agent, or Firm*—Oblon, Spivak, McClelland, Maier & Neustadt, P.C.

(57) ABSTRACT

A load beam is provided with a base plate and a slider. A magnetic head apparatus is fixed to a head arm via a base plate. In a mechanism or structure for supporting such a magnetic head supporting mechanism, an elastically deformable portion is provided between the base plate and the load beam. Thus, a floating structure that allows the load beam to swing is formed about the elastically deformable portion. In addition, a weight of the load beam is balanced with respect to the elastically deformable portion. Furthermore, a contact portion for applying pressure to the load beam is provided on the head arm so that a pressing load to a recording medium would be set by an amount of rotation of the load beam caused by the pressure applied by the contact portion.

32 Claims, 10 Drawing Sheets

MAGNETIC HEAD APPARATUS, MAGNETIC HEAD SUPPORTING MECHANISM AND MAGNETIC RECORDING APPARATUS HAVING AN IMPROVED IMPACT RESISTANCE

BACKGROUND OF THE INVENTION

1. Field of the Invention

The present invention relates to a magnetic head apparatus, a magnetic head supporting mechanism and a magnetic recording apparatus. Specifically, the present invention relates to a magnetic head apparatus, a magnetic head supporting mechanism and a magnetic recording apparatus that have improved impact resistance.

2. Related Background Art

Figure 15:
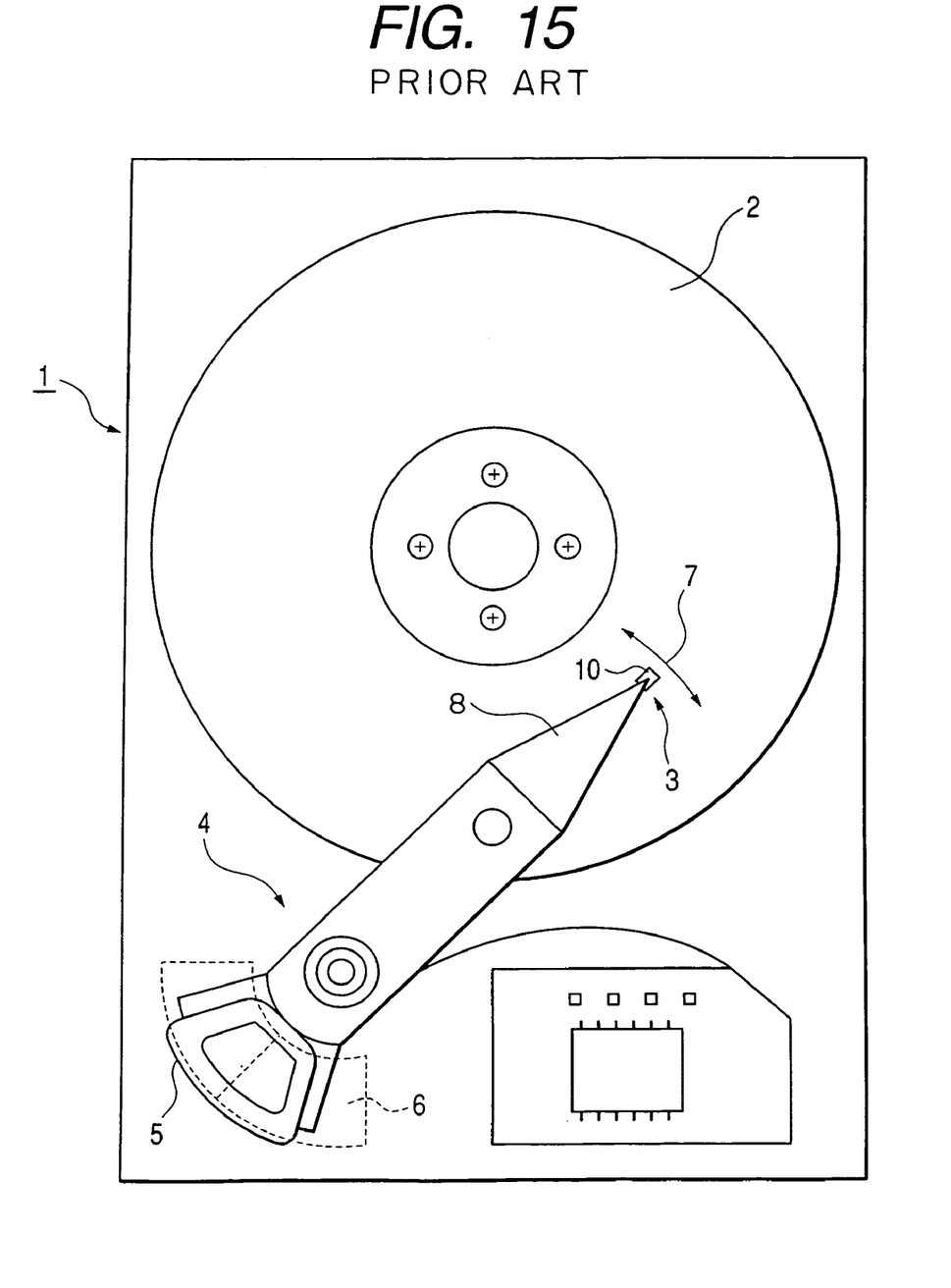
FIG. 15 is a drawing illustrating the outline of a conventional magnetic recording apparatus.

FIG. 15 is a drawing schematically illustrating the outline of a prior art magnetic recording apparatus. The magnetic recording apparatus 1 shown in FIG. 15 is provided with a magnetic disk 2 serving as a rotatable recording medium and a magnetic head supporting mechanism 4 for moving a magnetic head 3 floating above the magnetic disk 2 in the radial direction of the magnetic disk 2. In the magnetic recording apparatus 1 having the above-described structure, a servo signal (i.e. position information) that has been written in the surface of the magnetic disk in advance is read by the magnetic head 3, and electric power is supplied to a movable coil 5 provided at the opposite end of the magnetic head 3 in accordance with the read information, so that a force is generated in a magnetic circuit 6 in the directions indicated by arrow 7. Thus, the magnetic head 3 is moved to a target track (or a target position).

Figure 16:
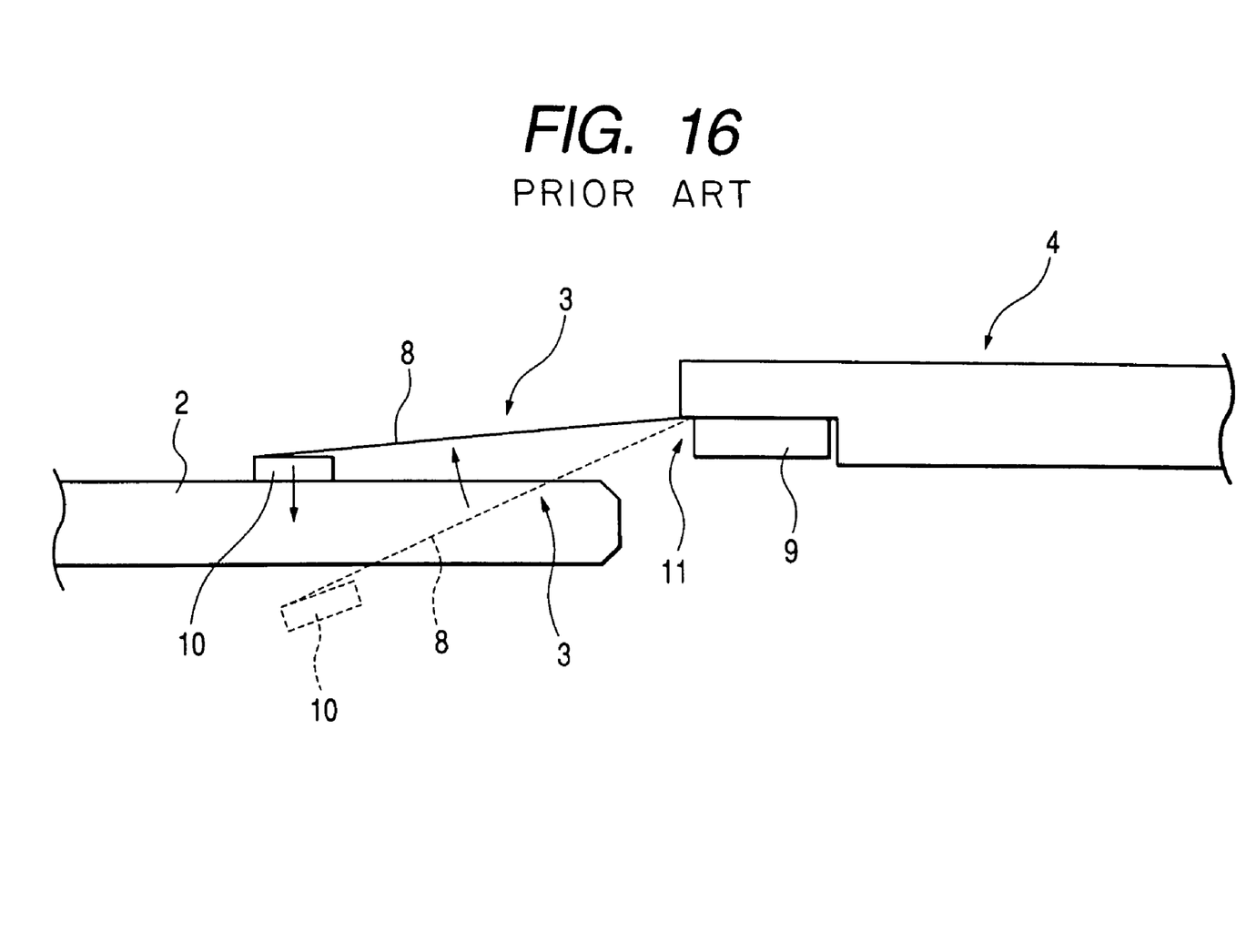
FIG. 16 is a drawing schematically illustrating how a magnetic head apparatus is assembled with a magnetic disk.

FIG. 16 is a drawing schematically showing how the magnetic head apparatus is disposed in relation to the magnetic disk. As shown in this drawing, a load beam 8 is provided at the intermediate portion of the magnetic head 3. One end portion of the load beam 8 is secured to a base plate 9 that makes a junction with the magnetic head supporting mechanism 4. On the other end portion of the load beam 8, there is provided a slider 10 secured thereto. In addition, a leaf spring portion is provided at the boundary 11 of the load beam 8 and the base plate 9. A pressing load (i.e. so-called load pressure) of the slider 10 against the magnetic disk 2 is provided by an urging force generated by this leaf spring portion.

However, the above-described magnetic recording apparatus suffers from the following problem. The mounting structure of the conventional magnetic head apparatus is a cantilever structure with the base plate 9 being the pivot. Therefore, if for example, an impact is applied to it in the vertical direction (i.e. the thickness direction of the magnetic disk 2), a rotation moment (or torque) about the base plate 9 is generated with the slider 10 being a mass point. When the rotation moment thus generated exceeds the rotation moment with respect to the base plate 9 generated by the pressing load for the slider 10, the slider 10 would detach from the surface of the magnetic disk 2 for a moment and then hit the surface of the magnetic disk 2. This can damage the magnetic head 3 itself or make a flaw on the surface of the magnetic disk 2 to deteriorate data that have already been written.

On the other hand, the apparatus is so adapted that the pressing load for the slider 10 about the base plate 9 is generated by the leaf spring portion formed at the root side end of the load beam 8 (i.e. at the boundary with the base plate 9). Therefore, it is required to form two different portions (i.e. the leaf spring portion and a rigid body portion) having different properties in the load beam 8, namely, the structure of the load beam 8 is complex. This is another problem. In addition, forming of the leaf spring portion requires high precision bending processing on the load beam and inspection after the processing, which increases the number of the manufacturing processes. This is also a problem.

Various technologies for eliminating the above-mentioned problems have been proposed. For example, Japanese Patent Application Laid-Open No. 9-82052 discloses a structure provided with a second load beam that extends from a load beam attached with a slider at the opposite end thereof and a loading member provided on the second load beam so that the center of the acceleration caused by an impact would coincide with the center of rotation of the slider.

Another document Japanese Patent Application Laid-Open No. 8-102159 discloses a structure in which a free end portion of a suspension can be in contact with a pin-like projection provided on a base or a cover. In addition, Japanese Patent Application Laid-Open No. 2001-57032 discloses a structure provided with a limiter that is formed as an extension from a part of a base portion for mounting a suspension to limit a movable range of the load beam so as to prevent a damage caused by an impact.

However, in the structure disclosed in Japanese Patent Application Laid-Open No. 9-82052, the load applied to the slider is given by a spring bias provided in the load beam. Therefore, high precision bending processing is required to be made on the load beam. In addition, since a spring mechanism is present in the intermediate portion of the mechanism, it is difficult to prevent flipping due to a rotation moment generated by an acceleration applied to the load beam. On the other hand, the structure disclosed in Japanese Patent Application Laid-Open No. 8-102159 provides a countermeasure only against an impact applied under the state in which the magnetic head apparatus is in a shipping zone (i.e. the state in which the magnetic disk is out of operation), but it does not provide any countermeasure against an impact applied under the state in which the magnetic head apparatus is in the data zone (i.e. the state in which the magnetic disk is under operation). In addition, in the structure disclosed in Japanese Patent Application Laid-open No. 2001-57032, in spite of the provision of the limiter for limiting the movable range of the load beam, the load applied to the slider is given by a spring bias provided in the load beam. Therefore, high precision bending processing is required to be made on the load beam, as is the case with the structure disclosed in Japanese Patent Application Laid-Open No. 9-82052.

Furthermore, it would be effective to shorten the distance from the leaf spring portion to the slider by cutting down the whole length of the load beam for the purpose of reducing the moment of the slider as a mass point generated about the leaf spring portion. It is true that this countermeasure is effective for magnetic recording apparatus with small media. However, in a normal magnetic recording apparatus having a medium with the size from 2.5 inches to 3.5 inches, it is necessary to extend the length of the magnetic head supporting mechanism in order to compensate the reduction in the length of the load beam (since the medium size is large). Therefore, there is a problem in that it would be difficult to realize an appropriate weight balance with respect to the rotation axis of the magnetic head supporting mechanism.

On the other hand, in a normal magnetic recording apparatus having medium with the size from 2.5 inches to 3.5 inches, if the load beam is elongated in order to reduce the moment of inertia of the magnetic head supporting mechanism about its rotation axis, the distance from the leaf spring portion to the slider is also elongated and the weight (or mass) suspended by the spring (i.e. the weight of the load beam and the parts attached thereto such as the slider) increases due to the elongation of the load beam. Therefore, the slider becomes apt to be detached from the surface of the recording medium when an impact is applied, and the impact resistance is reduced still more.

On the other hand, in order to realize a track seeking operation on the magnetic recording medium, it is necessary to provide a support member for a head gimbal assembly. This support member, which is referred to as an arm, is constructed as a part extending from a pivot bearing portion in the direction toward the medium. In view of spatial requirements in the interior of the magnetic recording apparatus, the supporting arm is generally constructed by a thin plate made of aluminum or a stainless steel. However, such a thin plate does not have sufficient strength against an impact that may be applied to it, and therefore the support arm can deform at its free end when acceleration is generated by an impact. This sometimes causes a crash of the head assembly attached on the tip of the arm.

SUMMARY OF THE INVENTION

The present invention has been made in view of the above-described problems. An object of the present invention is to enhance impact resistance of a magnetic recording apparatus during both operating state and non-operating (or resting) state irrespective of the size of the apparatus and to provide a magnetic head apparatus, a magnetic head supporting mechanism and a magnetic recording apparatus in which a pressing load against a recording medium can be set easily and with high precision.

The present invention has been made based on the concept that in a magnetic head apparatus, a magnetic head supporting mechanism and magnetic recording apparatus, if the whole of a suspension is constructed as a structure that behaves as an integral rigid body and a spring structure is provided between that rigid body and a mounting member, it is possible to provide a necessary pressing load while a load caused by an impact is concentrated to the fulcrum of a balance structure.

According to the present invention, there is provided a magnetic head apparatus comprising a load beam to which a floating type slider is attached, an elastically deformable portion provided on the load beam so that a floating structure that allows the load beam to swing is formed about the elastically deformable portion, and a load generating portion, wherein a position of the load generating portion is adapted to coincide with a center of mass of said load beam, and a pressing load of the slider against a recording medium is set by a pressure generated at the load generating portion.

According to another mode of the present invention, there is provided a magnetic head apparatus comprising a load beam to which a floating type slider is attached, an elastically deformable portion provided on the load beam, so that a floating structure that allows the load beam to swing is formed about the elastically deformable portion, a projecting portion for generating a load disposed in the vicinity of the elastically deformable portion of the load beam, and a pressure receiving surface provided on said load beam for receiving a pressure from said projecting portion, wherein a position of said projecting portion for generating a load is adapted to coincide with a center of mass of said load beam, and a pressing load of said slider against a recording medium is set by a pressure applied to said pressure receiving surface.

According to a more specific mode of the present invention, there is provided a magnetic head apparatus comprising a base plate adapted to be attached to a head arm, a load beam that extends from the base plate, a floating type slider attached to the load beam, an elastically deformable portion provided between the base palate and the load beam, so that a floating structure that allows said load beam to swing is formed about the elastically deformable portion, a projecting portion for generating a load disposed in the vicinity of the elastically deformable portion of the load beam, a pressure receiving surface provided on the load beam, wherein a position of said projecting portion for generating a load is adapted to coincide with a center of mass of said load beam, a pressing load is applied to a surface of a recording medium via the floating type slider, and a pressing load of the slider against the recording medium is set by a pressure applied to said pressure receiving surface. The balancing of the weight may be attained by providing a dead weight in the form of an ordinary balance weight or a vibration damping member or using other functional parts. Furthermore, it is preferable that the load beam be made of a lightweight metal such as a stainless steel or aluminum or a lightweight material such as a resin. As the resin for the load beam, an electrically conductive resin may be used in order to attain electrical contact with an external member. Alternatively, an electrically conductive coating may be formed on the resin in order to attain electrical contact with an external member via the electrically conductive coating. The above-mentioned dead weight may be made of a resin. In addition, the head arm may be supported in such a way as to be pivotable in a radial direction of said recording medium, and the head arm may have a strengthen plate that is attached to said head arm perpendicularly in such a way that it would not interfere with said recording medium.

According to the present invention, there is also provided a magnetic head supporting mechanism comprising a magnetic head apparatus including a base plate and a load beam extending from the base plate, a head arm attached to said base plate, an elastically deformable portion that is flexible provided between the base plate and the load beam so that a floating structure that allows the load beam to swing is formed about the elastically deformable portion, a projecting portion for generating a load disposed in the vicinity of the elastically deformable portion of the load beam, and a projecting portion for generating a load provided on the head arm, the projecting portion being adapted to apply a pressure to the load beam, wherein a position of the projecting portion for generating a load is adapted to coincide with a center of mass, a pressing load is applied to a recording medium via a floating type slider attached to the load beam, and the pressing load to the recording medium is set by the amount of rotation of the load beam caused by the pressure applied by the projecting portion for generating a load. The position of the above-mentioned center of mass may be adjusted by using a dead weight made of a vibration damping member or other functional parts as well as an ordinary weight. Furthermore, it is preferable that the load beam be made of a lightweight metal such as a stainless steel or aluminum or a lightweight material such as a resin. As the resin for the load beam, an electrically conductive resin may be used in order to attain electrical contact with an external member. Alternatively, an electrically conductive coating may be formed on the resin in order to attain electrical contact with an external member via the electrically conductive coating. The above-mentioned dead weight may be made of a resin. In addition, the head arm may be supported in such a way as to be pivotable in a radial direction of said recording medium, and the head arm may have a strengthen plate that is attached to said head arm perpendicularly in such a way that it would not interfere with said recording medium. The base plate may be provided as a separate member different from the load beam, or alternatively, the base plate may be provided as a part integral with the load beam.

Furthermore, according to the invention, there is provided a magnetic recording apparatus equipped with the above-mentioned magnetic head apparatus or magnetic head supporting mechanism.

In connection with the above, the term "floating structure" refers to a structure in which a load beam and a base plate is not joined by a rigid body, so that an impact applied on the base plate can prevented from being transmitted to the load beam linearly.

In the above-described structures of the various apparatus, the elastically deformable portion is provided at the position at which the load beam attached with the slider is balanced. (Alternatively, the elastically deformable portion is provided on the load beam, and a dead weight is attached to the load beam at a position opposite to the position at which the slider is attached so that the balancing would be attained.) When a floating structure that allows the load beam to swing is realized by the support or suspension of the load beam by the elastically deformable portion positioned as above, it is possible to prevent a rotational force about the elastically deformable portion from being created, even if an impact is applied to the load beam. Thus, the slider will not be detached from the recording medium by such a rotational force. Therefore, it is possible to prevent the slider from colliding with the recording medium to damage it or prevent the magnetic head apparatus itself from being damaged by an impact. The load beam would be rotated or swung about the elastically deformable portion by application of an external pressure to the load beam. Therefore, a pressing load of the slider against the recording medium can be set (or determined) by adjusting the amount of the rotation. Since the pressing load is determined by the rotation amount of the load beam in this way, it is possible to create an accurate pressing load and to suppress variations in the pressing load. In addition, an elastic portion for providing a pressing load to the load beam need not be formed on the load beam, and so a high precision bending process for processing the load beam or an inspecting process for measuring a spring load can be omitted. Therefore, it is apparent that the manufacturing process of the apparatus can be made simple.

With the structure in which the load beam is joined to the base plate via the elastically deformable portion, it is not necessary to construct the whole of the magnetic head apparatus or the whole of an actuator (including a head arm and VCM etc.) as a floating structure, but only the load beam and the parts attached thereto on the tip portion of the magnetic head apparatus would be constructed as a floating structure. Therefore, the weight or mass of the portion provided below the elastically deformable portion is reduced (i.e. reduction of the mass suspended by a spring). This reduction of the weight would results in enhancement of impact resistance.

Furthermore, with the structure in which a contact portion is formed on the head arm, when the pressure receiving surface on the load beam is pressed by the contact portion, the load beam is rotated about the elastically deformable portion by an amount corresponding to the height of the contact portion. Therefore, it is possible to obtain a pressing load without a variation between individual products, by controlling the projecting height of the contact portion.

The balancing of the weight of the load beam with respect to the elastically deformable portion may be attained by adding a dead weight to the load beam and/or by forming a hole for the purpose of reducing the weight. When the dead weight is attached to the load beam, a vibration damping member such as a vibration suppressing steel plate may preferably be used as the dead weight. In that case, the peak value of the natural resonance frequency of the load beam can be reduced as desired. Therefore, stability of the actuator system can be enhanced.

In the present invention, the load beam is not required to have an elastic portion, and therefore the load beam may be made of various materials. In other words, the material of the load beam is not limited to conventional metal materials such as a stainless steel, but the load beam may be made of a resin. With the use of load beam made of a resin, it is possible to reduce the weight greatly as compared to conventional load beams made of metal materials. In other words, the weight or mass of the portion provided below the elastically deformable portion is reduced with the use of the load beam made of a resin (i.e. reduction of the mass suspended by the spring). This reduction of the weight would further enhance impact resistance.

If the resin for the load beam is an electrically conductive resin, it is possible to make the electric potential of the load beam, the actuator and the base side of the magnetic recording apparatus equal to each other. Therefore, it is possible to prevent electrostatic discharge from occurring on the load beam. Thus, damaging of the magnetic head apparatus by static electricity can be prevented. The same effect would also be realized by forming an electrically conductive coating on a resin instead of using an electrically conductive resin. It is preferable that the electrically conductive coating be a metal coating in view of its low volume resistance. It is apparent that the combination of an electrically conductive resin and an electrically conductive coating would realize a more preferable effect.

With the use of the above-described magnetic head apparatus or the actuator in a magnetic recording apparatus, it is possible to enhance impact resistance of the magnetic recording apparatus both in an operating state and in a non-operating state, irrespective of the size of the magnetic recording apparatus. Therefore, reliability of the magnetic recording apparatus can be enhanced.

It should be understood that the term "magnetic head apparatus" refers to an apparatus in the form of a head gimbal assembly (HGA) including a slider and a load beam, while the term "magnetic head supporting mechanism" refers to a structure including the magnetic head apparatus and a head arm (and a base plate).

Other features and objects of the present invention will become apparent from the following detailed description and the annexed drawings.

DESCRIPTION OF THE PREFERRED EMBODIMENTS

In the following embodiments of a magnetic head, a magnetic head supporting mechanism and a magnetic recording apparatus according to the present invention will be specifically described with reference to the annexed drawings.

Figure 1:
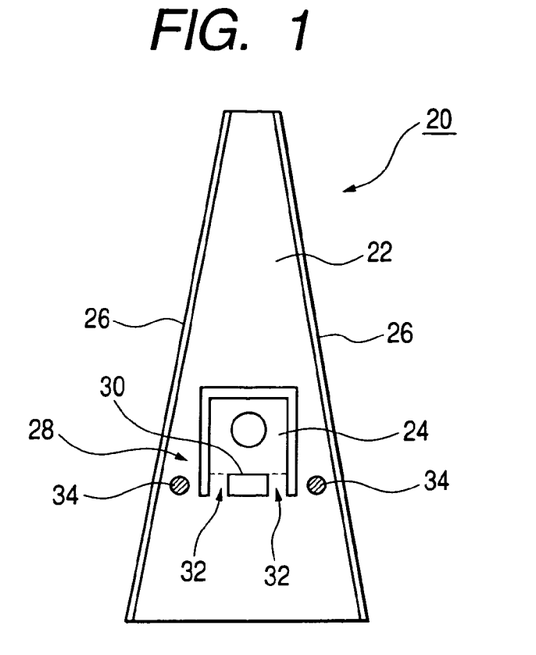
FIG. 1 is a plan view showing the structure of a magnetic head apparatus as an embodiment of the present invention.

FIG. 1 is a plan view showing the structure of a magnetic head apparatus as an embodiment of the present invention.

As shown in FIG. 1, the magnetic head apparatus 20 according to this embodiment has a load beam 22 having an outer shape like an isosceles triangle. On an inner portion of the load beam 22, there is provided a base plate 24 functioning as a mount portion to be attached to a head arm (which will be described later).

The load beam 22 is made by pressing or etching a thin metal plate. More specifically, the thin metal plate is a non-magnetic stainless steel (e.g. an austenite stainless steel). The edges of the load beam 22 corresponding to the two isometric sides of the isosceles triangle shape are formed into bent portions 26. Each bent portion 26 is formed by bending the edge of the load beam 22 at a certain angle or bending the edge into a half round shape (i.e. semicylinder shape). With the provision of the bent portions 26, rigidity with respect to the longitudinal direction of the load beam 22 can be assured.

At the center of the load beam 22 between the bent portions 26 formed at the right and left edges, a slit 28 of an inverted U-shape (in FIG. 1) is formed. The tongue surrounded by the slit 28 is adapted to serve as the above-mentioned base plate 24.

Figure 2:
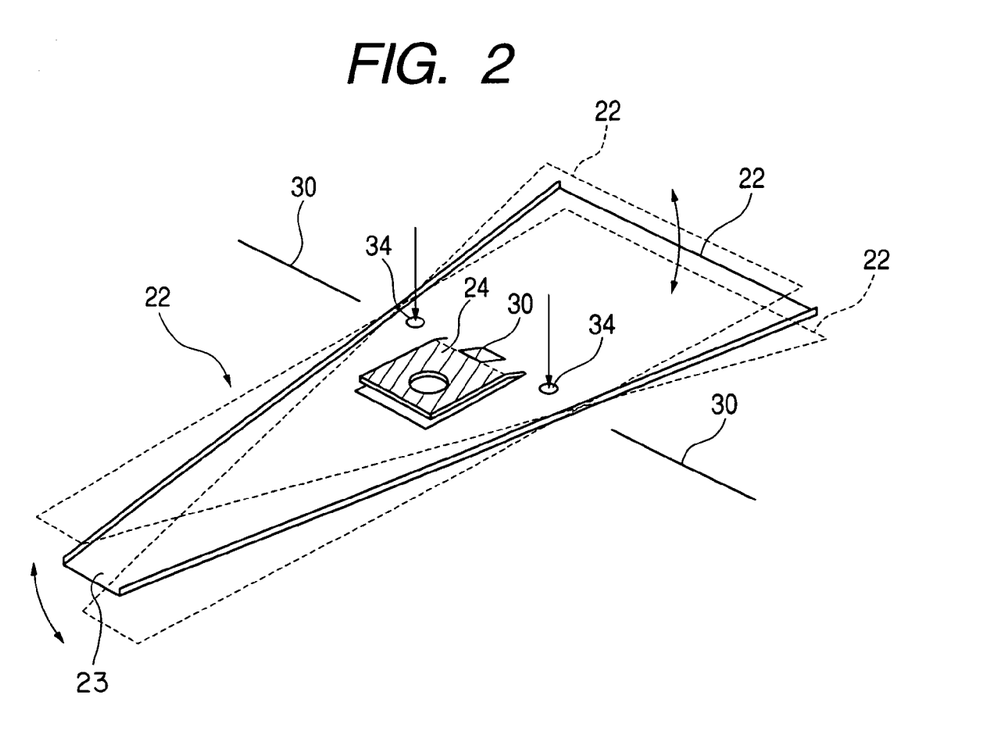
FIG. 2 is a drawing for illustrating states in which a load beam is swung by a pressing force applied to a pressure receiving surface.

The boundary portion 32 between the base plate 24 and the load beam 22 (namely, the portion along line 30 in FIGS. 1 and 2) functions as a cantilevered leaf spring portion that serves as an elastically deformable portion. At positions slightly offset from line 30 on the load beam 22, there is provided a pair of pressure-receiving surfaces 34. Thus, after the base plate 24 is fixed, the load beam 22 can swing or pivot about line 30 upon receiving pressing force applied externally of the magnetic head apparatus 20 on the pressure receiving surfaces 34. The swinging of the load beam 22 in response to application of a pressing force is illustrated in FIG. 2.

At the tip end portion (i.e. the upper end portion in FIG. 1) of the load beam 22, a slider 36 (see FIG. 3) in which an element for performing writing/reading of a recording medium is assembled is mounted via a gimbal (not shown).

Figure 3:
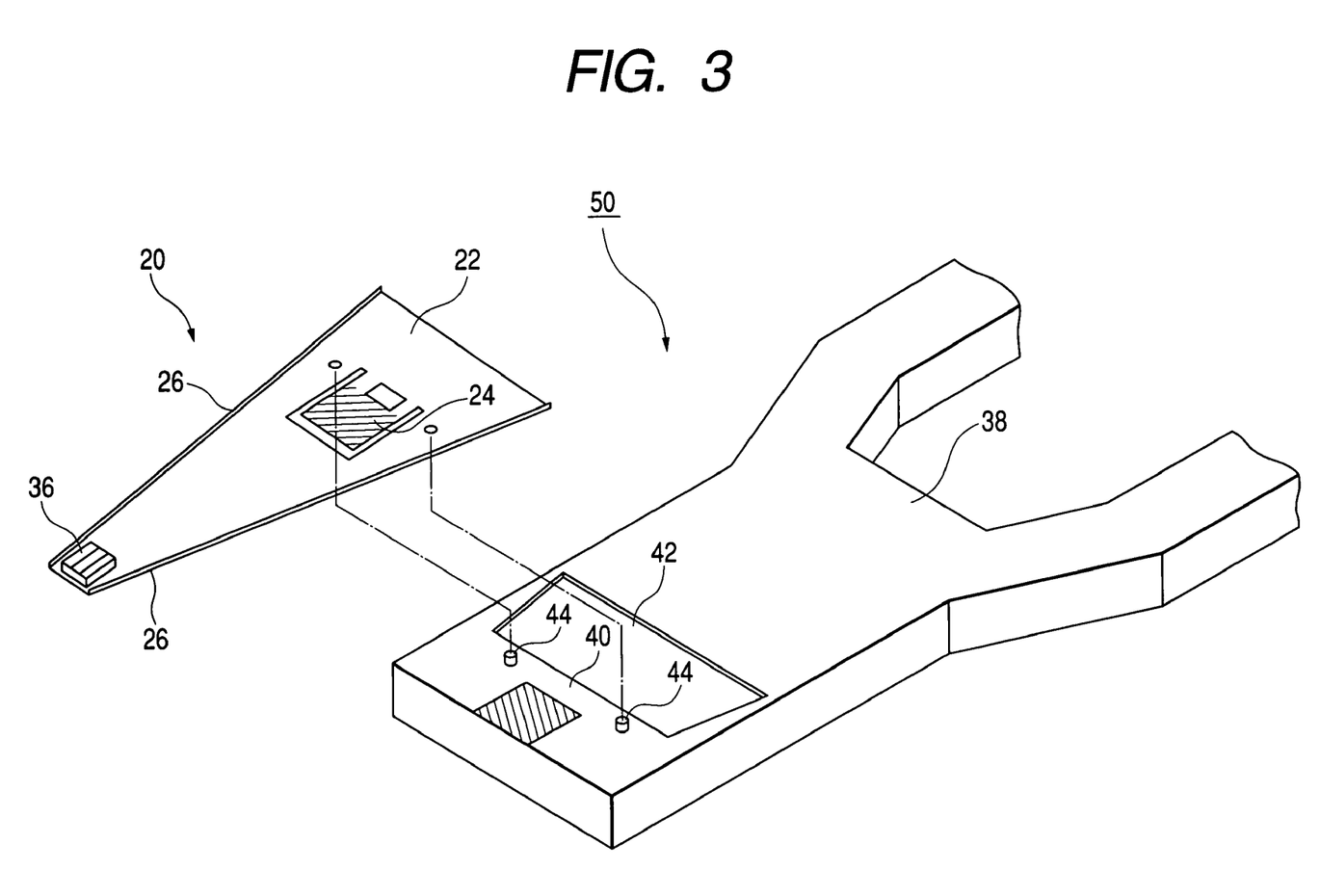
FIG. 3 is an exploded view showing how the magnetic head apparatus and a head arm are assembled in relation to each other.
Figure 4:
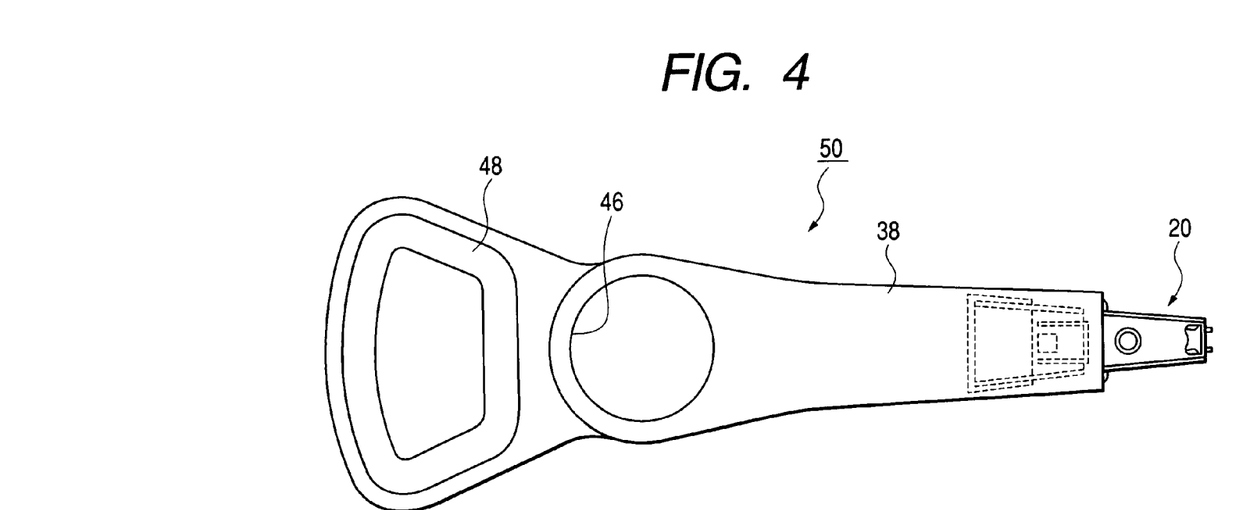
FIG. 4 is a front view showing a magnetic head supporting mechanism formed by mounting the magnetic head apparatus to the head arm.

FIG. 3 is an exploded view showing how the magnetic head apparatus and a head arm are assembled in relation to each other. FIG. 4 is a front view of a magnetic head supporting mechanism formed by mounting the magnetic head apparatus to the head arm.

As shown in FIGS. 3 and 4, at the tip end portion of the head arm 38 to which the magnetic head apparatus is to be mounted, there is provided a plate mounting surface 40 to which the base plate 24 is to be fixed. The size of the plate mounting surface is the substantially the same as the size of the base plate 24 in the magnetic head apparatus. The head arm 38 has a recess 42 formed at the periphery of the plate mounting surface 40. The recess 42 has the width sufficient for receiving the width of the load beam 22, so that when the magnetic head apparatus is assembled with a recording medium, the rear end portion of the load beam 22 is prevented from interfering with the head arm 38. If the magnetic head apparatus in a floating (or hovering) state does not obstruct loading, the recess 42 may be omitted.

The head arm 38 is further provided with a pair of projections serving as contact portions formed at positions that are closer to the tip end than the plate mounting surface 40. When the base plate 24 is aligned with the plate mounting surface 40, the top portions of the pair of projections 44 are in contact with the pressure receiving surfaces 34 provided on the load beam in advance to press them.

The head arm is provided with a center hole 46 in which a bearing is accommodated and a coil 48 constituting a VCM (i.e. voice coil motor) disposed on the rear side of the center hole 46. The head arm 38 can swing about the center hole 46 with supply of electrical power to the coil 48. It is desirable that the magnetic head supporting mechanism 50 including the magnetic head apparatus 20, the head arm 38 and the coil 48 be balanced with respect to the center hole 46, in order to minimize influences of external disturbances.

Figure 5:
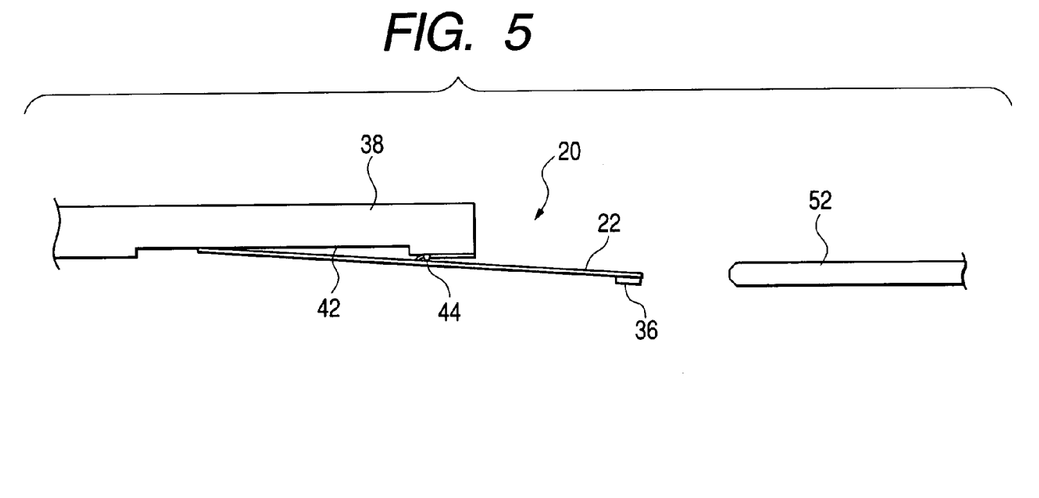
FIG. 5 is a drawing for illustrating how the magnetic head apparatus according to the embodiment of the present invention is assembled with a recording medium, which shows a state before the assembling.
Figure 6:
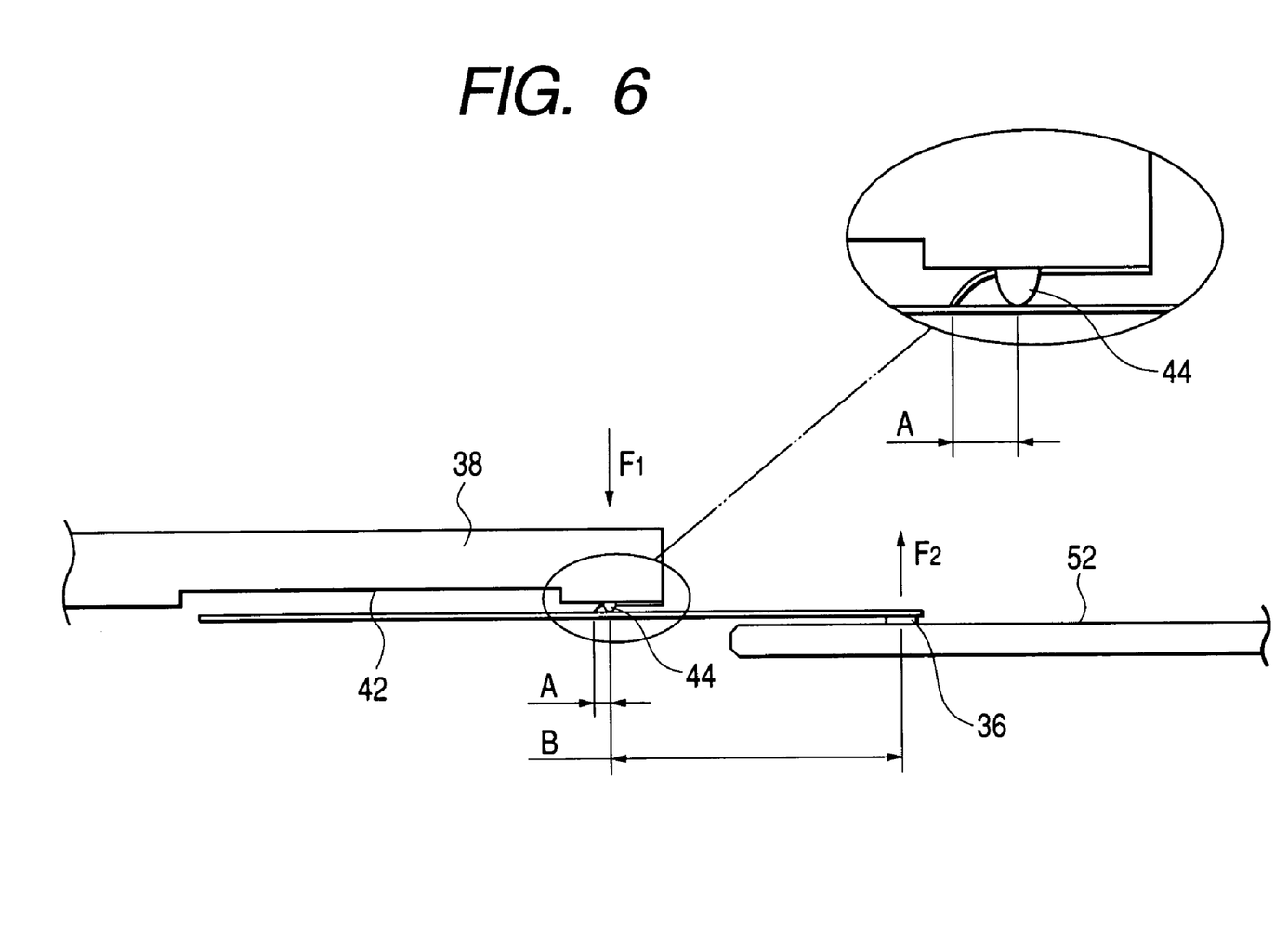
FIG. 6 is a drawing for illustrating how the magnetic head apparatus according to the embodiment is assembled with a recording medium, which shows a state after the assembling.

FIGS. 5 and 6 are drawings illustrating how the magnetic head apparatus according to the present embodiment is assembled to the recording medium.

As shown in FIG. 5, the magnetic head apparatus 20 according to the present embodiment is first fixed to the head arm 38 by spot welding or other attaching processes. When the magnetic head apparatus 20 is fixed to the head arm 38, the pair of projections 44 provided at the tip end portion of the head arm 38 press the load beam 22 to cause the load beam 22 to swing or pivot in such a way that the slider 36 is lowered relative to the recording medium 52. In this process, the load beam 22 can swing without being flexed, since rigidity is assured by the bent portions 26 formed at both the edges. Even when the load beam 22 is swung by pressure applied by projections 44, the rear end of the load beam 22 does not interfere with the head arm 38 by virtue of the presence of the recess 42 formed on the head arm 38. (In other words, the recess 42 should be formed with the depth that is sufficient for preventing the interference in accordance with the inclination of the load beam 22.) Therefore, it is also possible to prevent dust from being generated by interference of the parts.

As shown in this drawing, after the magnetic head is fixed to the head arm 38, the load beam is swung, by means of a jig, in such a way that the slider 36 comes to a position higher than the surface of the recording medium 52, and then the slider 36 is landed (or loaded) on the surface of the recording medium 52. FIG. 6 shows the apparatus in this state. In the state shown in FIG. 6, the following condition is met, where A represents the distance from the projections 44 for creating load to the junction of the leaf spring and the load beam, B represents the distance from the projections 44 to the slider 36, F1 is the pulling-up force of the leaf spring and F2 is the reactive force exerted to the slider 36 by the recording medium 52 (a loss that might occur due):

$$F1 \cdot A = F2 \cdot B \quad \text{(conditional expression 1).}$$

In other words, the moment about the projections 44 created by the pressing force is equal to the moment created by the reactive force. Therefore, the reactive force of the recording medium 52 that influences the floating characteristics of the slider can be set or adjusted by adjusting the height of the projections 44.

Figure 7:
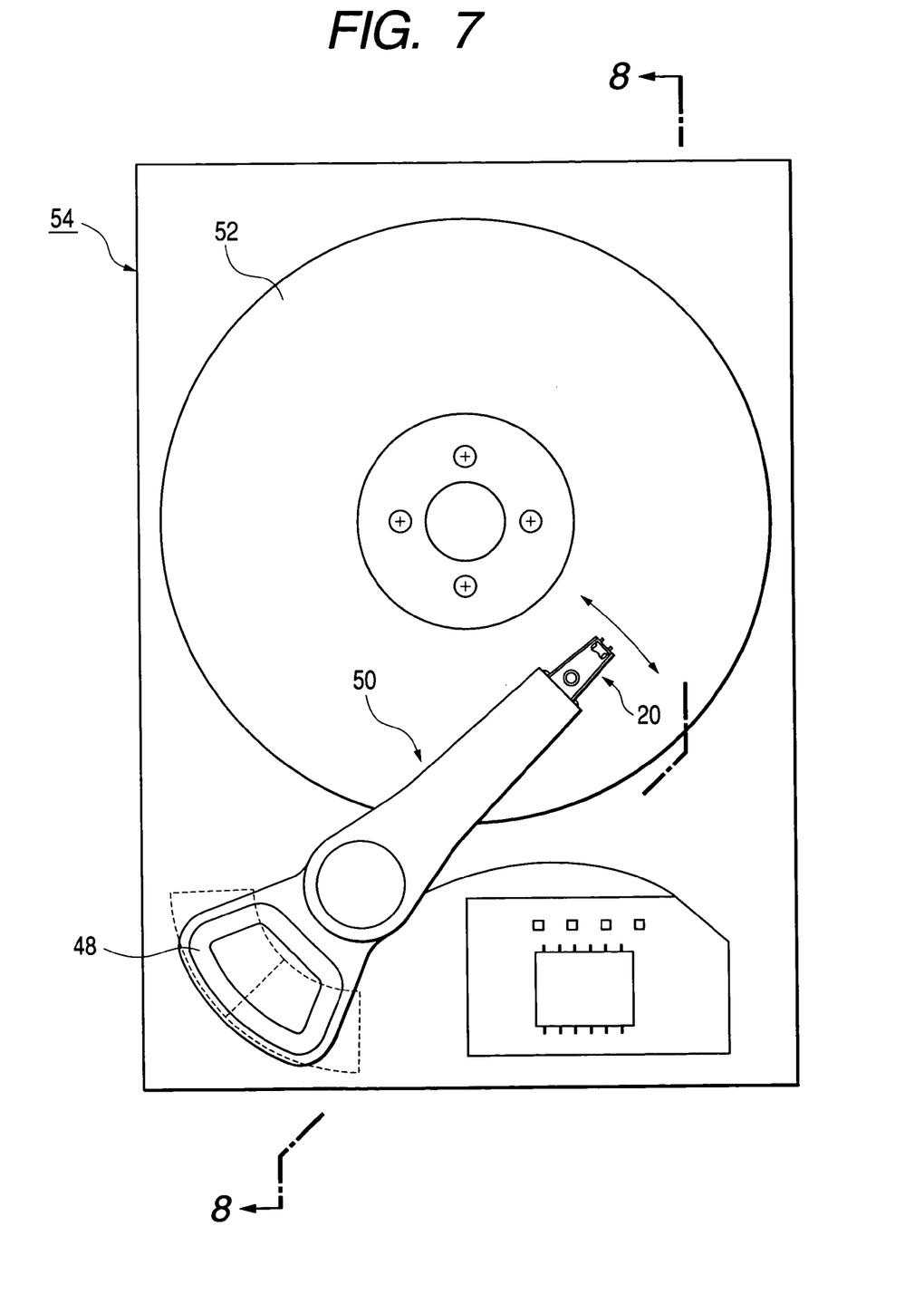
FIG. 7 is a plan view showing a magnetic recording apparatus equipped with the magnetic head or a magnetic head supporting mechanism according to the embodiment of the present invention.
Figure 8:
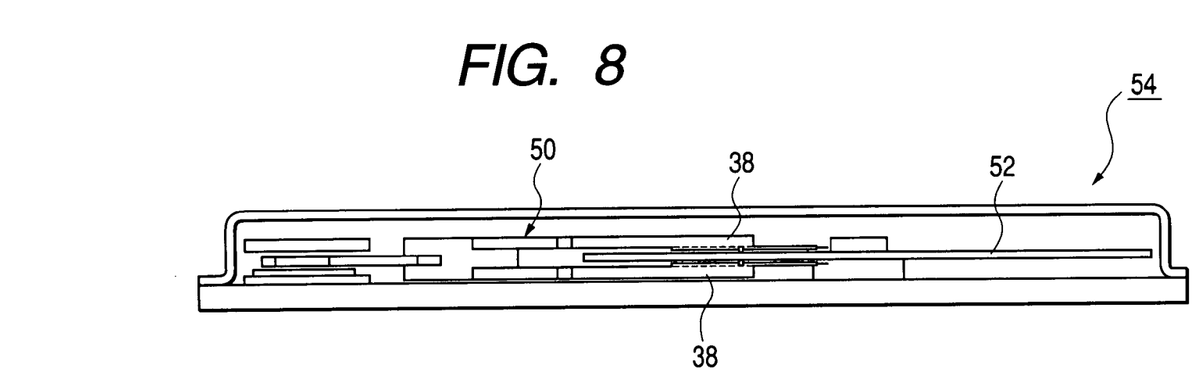
FIG. 8 is a cross sectional view taken on line 8—8 in FIG. 7.

FIG. 7 is a plan view showing a magnetic recording apparatus equipped with the magnetic head or the magnetic head supporting mechanism according to the present invention. FIG. 8 is a cross sectional view taken along line 8—8 in FIG. 7.

The distinguishing features of the magnetic recording apparatus shown in these drawing reside in the magnetic head supporting structure 50 and its peripheral structures, and other parts of the apparatus such as a spindle motor for rotationally driving the recording medium 52 are the same as those in conventional apparatus. Therefore, a magnetic recording apparatus 54 having improved impact resistance can be realized only by substituting the magnetic head supporting structure 50 for that in a conventional apparatus.

Figure 9:
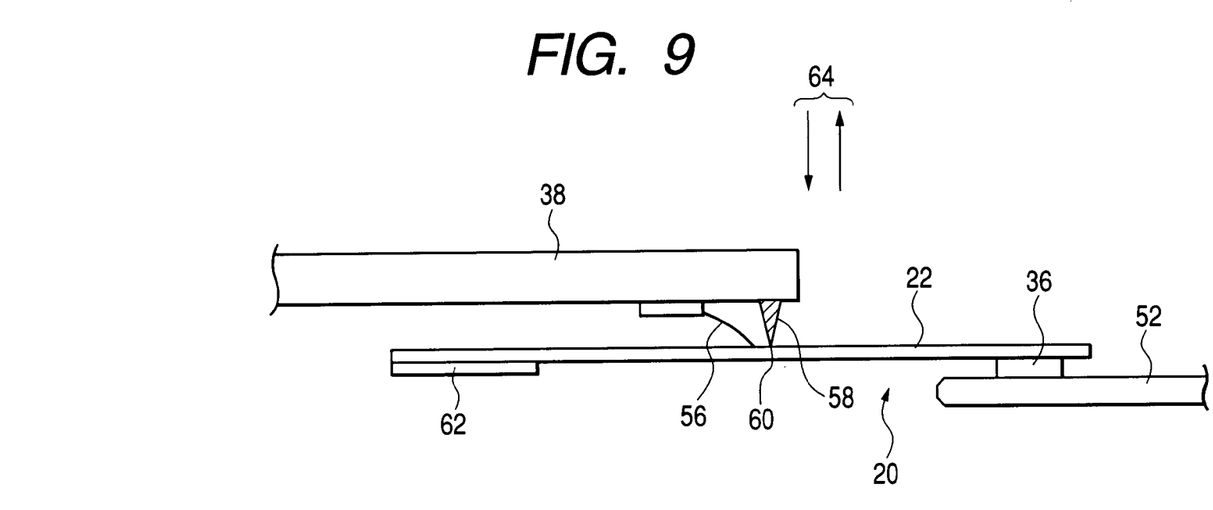
FIG. 9 is a schematic drawing for illustrating impact resistance performance of the magnetic head apparatus according to the embodiment of the present invention.

FIG. 9 is a schematic drawing for illustrating the impact resistance performance of the magnetic head apparatus according to the embodiment of the present invention.

As shown in FIG. 9, the head arm 38 and the load beam 22 are connected by the elastically deformable portion 56, and the pressure receiving surface 60 of the load beam 22 is pressed by the contact portion 58 provided on the head arm 38. The weight of the magnetic head apparatus 20 is arranged to be balanced with respect to the projecting portion 58. The balancing of the weight may be realized by adjusting the position of the elastically deformable portion 56 on the load beam and/or attaching a dead weight 62 on the load beam 22 at a position opposite to the slider 36 as shown in FIG. 9. In addition, if the dead weight 62 is made of a vibration damping member (or damper), it is possible to reduce the peak value of resonance with respect to the magnetic head apparatus 20, to thereby stabilize a control system (for positioning etc.) of the magnetic recording apparatus 54.

By virtue of the balanced weight of the magnetic head apparatus 20 with respect to the projecting portion 58, even if an impact is exerted on the apparatus in the direction of arrows 64 shown in FIG. 9, no rotational force is created in the load beam 22. Thus, the slider 36 is prevented from being detached from the surface of the recording medium when a strong impact is applied. Therefore, it is possible to eliminate adverse effects such as damaging of elements assembled in the slider or a defect on the recording medium 52 formed by collision with the slider 36.

In the apparatus according to this embodiment, since only the load beam 22 and the parts attached thereto (i.e. the slider 36 and the dead weight 62) are constructed as a floating structure via the elastically deformable portion 56, the mass suspended by the spring (i.e. the total mass of the load beam 22 and the parts attached thereto) below the elastically deformable portion 56 would be reduced. Letting W be the mass of the load beam 22 and the parts attached thereto suspended by the elastically deformable portion 56, Fs be a pressing force applied to the load beam 22 by the contact portion 58, and a be an impact acceleration created in the load beam 22 and the parts attached thereto, the following relation is met:

$$Fs = W \cdot a. \quad \text{(conditional expression 2).}$$

The inventors estimated by calculation the degree of improvement in impact resistance realized by the present invention. Assuming the mass W=30 mg (milligrams) and Fs=120 g (grams) the above relation is as follows:

120=0.03·a, therefore a=4000.

This means that as far as the impact acceleration is smaller than 4000G, it is possible to prevent the load beam 22 from detaching from the loading projections 44, and therefore, the slider 36 can be prevented from detaching from and colliding with the recording medium. Thus, the impact resistance can be greatly enhanced as compared to conventional apparatus. In addition the impact resistance of the magnetic head apparatus 20 according to this embodiment does not depend on the length of the head arm, namely it does not depend on the size of the recording medium.

The material of the load beam 22 is not limited to the above-described thin metal plate, and other materials can also be used as long as rigidity is assured.

The inventors have discovered that a resin coating is also used as a material for the load beam 22 instead of the thin plate of a stainless steel that have been conventionally used. With the use of a resin for the load beam 22, the mass suspended by the spring portion would be further reduced, and therefore the impact resistance performance can be improved still more. The inventors found that resins suitable for the load beam 22 are liquid crystal polymer resins or PPS resins that have electric conductivity, in view of their ability of preventing ESD (i.e. electro static discharge). It is desirable that the specific volume resistance of these resins be smaller than $10^5$ Ωcm.

Even a resin that does not have electric conductivity can also be effectively used if a metal coating is formed by plating etc. on the surface of the load beam 22 after it is injection molded so that its electrical potential would be always kept equal to the potential of the head arm 38.

Figure 10:
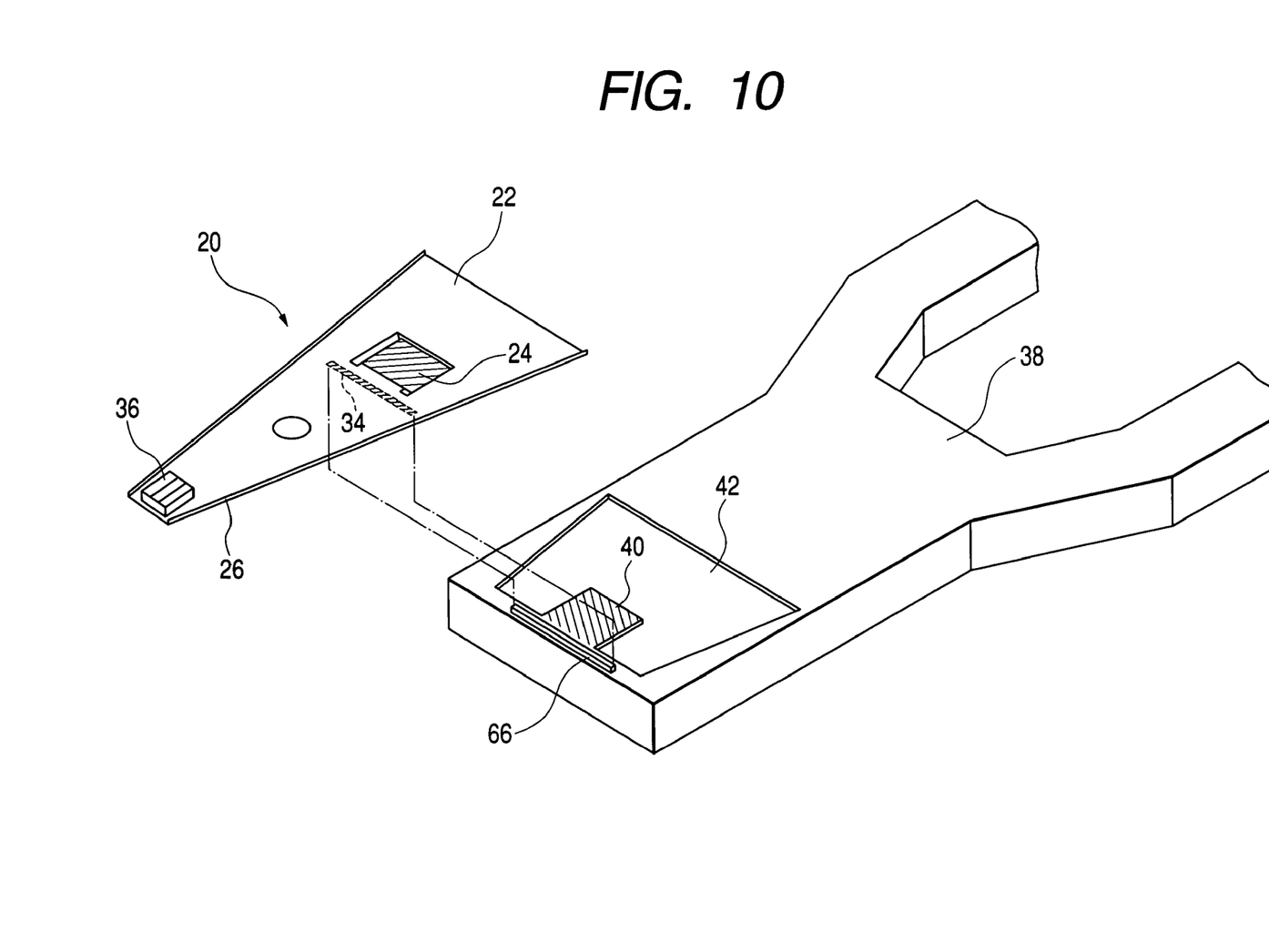
FIG. 10 is an exploded view showing a modification of the magnetic head supporting structure according to the embodiment of the present invention.
Figure 11:
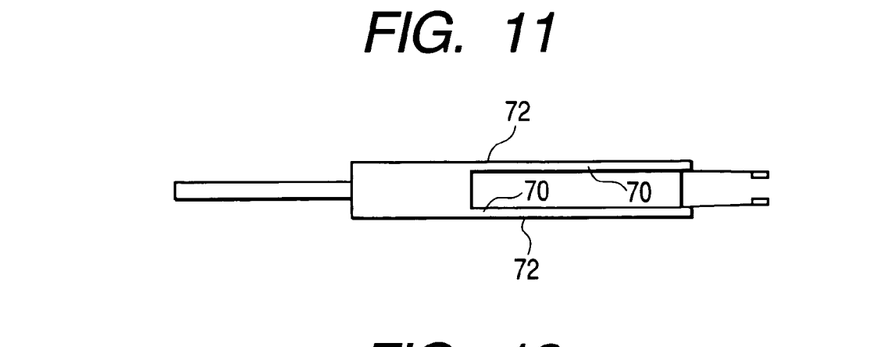
FIG. 11 is a side view showing an arm to which strengthen plates are attached.
Figure 12:
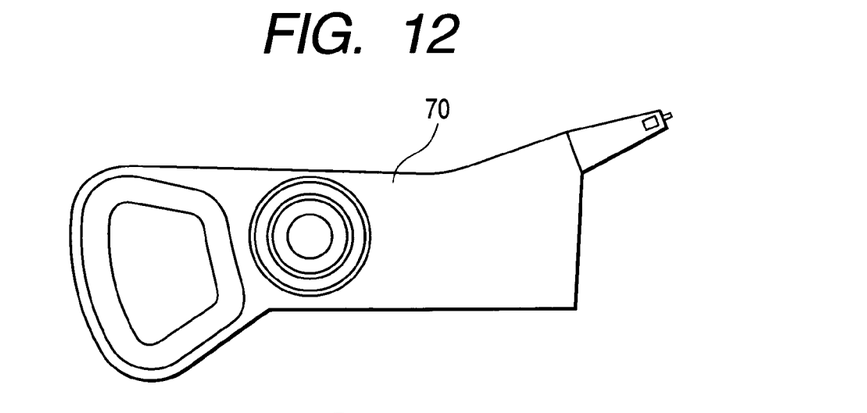
FIG. 12 is a plan view showing the arm assembly to which strengthen plates are attached.
Figure 13:
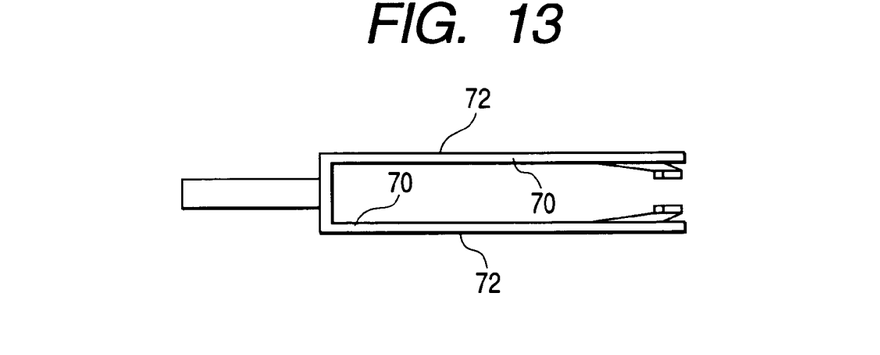
FIG. 13 is a drawing showing an arm assembly including multiple heads to which strengthen plate are attached.
Figure 14:
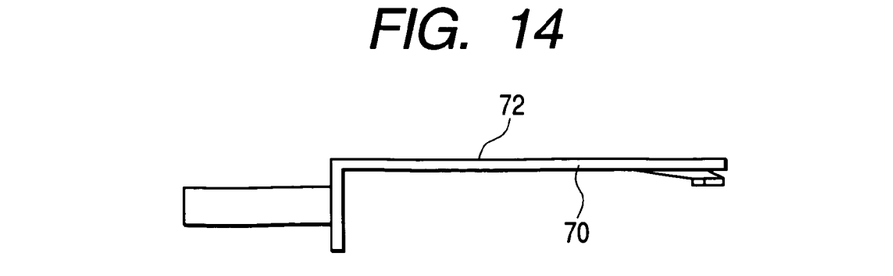
FIG. 14 is a drawing showing an arm assembly including a single head to which a strengthen plate is attached.

FIG. 10 is an exploded view showing a modification of the magnetic head apparatus according to the above-described embodiment. In FIG. 10, parts having the same functions as the parts in the above-described embodiment are designated with the same reference numerals and descriptions thereof will therefore be omitted.

In the structure of the modification shown in FIG. 10, the orientation of the slit and the spring portion is reversed and the projecting portion 66 is formed as a part extending transversely to the load beam on the slider side of the base plate with the spring portion between to create a load. In this case also, the weight or mass of a suspension slider assembly is arranged in such a way that its center of mass coincides with the projecting portion. In this structure, a necessary load can be provided as long as the conditions of the above-described principles are met, and the structure has stability against an impact.

As per the above, the magnetic head apparatus, the magnetic head supporting structure and the magnetic recording apparatus according to the above-described embodiments have improved impact resistance that does not depend on the size or the number of the recording medium(s).

While in the foregoing description of the embodiments the description has been made of a magnetic recording apparatus 54 of a CSS (contact start stop) type, the invention is not limited to the apparatus of that type. The invention may also be applied to an apparatus of a ramp load type in which a tab is provided at the tip of the load beam 22, which allows the slider to be retracted from the surface of the recording medium when it is not operated. In the apparatus of the ramp load type, when the apparatus is out of operation, the slider is riding on a ramp so that the slider and the recording medium are protected, while when the apparatus is under operation the slider and the recording medium are protected by the structure according to the embodiment. Therefore, reliability of the magnetic recording apparatus can be greatly enhanced.

As described before, in order to realize a track seeking operation on the magnetic recording medium, it is necessary to provide a support member for a head gimbal assembly. This support member, which is referred to as an arm, is constructed as a part extending from a pivot bearing portion in the direction toward the medium. In view of spatial requirements in the interior of the magnetic recording apparatus, the supporting arm is generally constructed by a thin plate made of aluminum or a stainless steel. However, such a thin plate does not have sufficient strength against an impact that may be applied to it, and therefore the support arm can deform at its free end when acceleration is generated by an impact. This sometimes causes a crash of the head assembly attached on the tip of the arm. In order to solve this problem, a strengthen plate(s) is attached to a head arm assembly including one or more head arms in order to enhance the strength of the arms against impact acceleration. The strengthen plate is attached to a side of the head arm assembly other than the side facing the recording medium in such a way that the strengthen plate extends perpendicular to that side of the arm assembly.

The arm has a projection(s) for generating the above-mentioned load disposed at a position at which a suspension is attached, wherein the impact resistance of the suspension itself has already been enhanced. With the provision of the strengthen plate(s) attached to extend perpendicularly to its side, the arm has a structure similar to a box that is supported at one side. Therefore, the strength against impact of the suspension attaching portion is enhanced. The arm(s) 72 to which the strengthen plate(s) 70 is attached is shown in FIGS. 11 to 14.

As has been described in the foregoing, in a magnetic head apparatus according to the present invention, an elastically deformable portion is provided on a load beam to which a floating type (or hovering type) slider is attached so that a floating structure that allows the load beam to swing would be formed about the elastically deformable portion, a center of pressure disposed in the vicinity of the elastically deformable portion is adapted to coincide with a center of mass, a pressure receiving surface for receiving pressure from a projecting portion is provided on the load beam, and a pressing load of the slider against a recording medium is set by a pressure generated at the load generating portion. A magnetic recording apparatus according to another mode of the present invention has a base plate and a load beam extending from the base plate, wherein a pressing load is applied to a surface of a recording medium via a floating type slider attached to the load beam, an elastically deformable portion is provided between the base plate and the load beam so that a floating structure that allows the load beam to swing would be formed about the elastically deformable portion, a center of pressure formed in the vicinity of the elastically deformable portion of the load beam is adapted to coincide with a center of mass, a pressure receiving surface for receiving pressure from a projecting portion is provided on the load beam, and a pressing load of the slider against a recording medium is set by a pressure generated at the load generating portion.

Furthermore, a magnetic head supporting mechanism according to the present invention has a magnetic head apparatus provided with a base plate and a load beam extending from the base plate and a head arm attached to the base plate, wherein a pressing load is applied to a recording medium via a floating type slider attached to the load beam, an elastically deformable portion that is flexible is provided between the base plate and the load beam so that a floating structure that allows the load beam to swing would be formed about the elastically deformable portion, the weight of the load beam is balanced with respect to the elastically deformable portion, and a contact portion for applying a pressure to the load beam is provided on the head arm so that the pressing load to the recording medium is set by an amount of rotation of the load beam caused by the pressure applied by the contact portion.

With the above-described features, impact resistance performance of the apparatus can be enhanced, and setting of pressing load to the recording medium can be effected easily with high accuracy. Therefore, it is possible to enhance reliability of the magnetic recording apparatus.

What is claimed is:

1. A magnetic head apparatus comprising:
   a load beam to which a floating slider is attached;
   a head arm that is supported at a proximal end thereof in such a way as to be pivotable in a radial direction of a recording medium and supports said load beam at a distal end of the head arm;
   an elastically deformable member provided on the load beam, so that a floating structure that allows said load beam to swing is formed about said elastically deformable member; and
   a load generating member for applying a load onto a predetermined position of said load beam;
   wherein, said predetermined position of said load beam is adapted to coincide with a center of mass of said load beam and is provided in proximity with a position at which said load beam is supported by said head arm; and
   a pressing load of said slider against the recording medium is set by a pressure generated at said load generating member.

2. A magnetic head apparatus according to claim 1, wherein balancing about said center of mass is attained by means of a dead weight made of a vibration damping member.

3. A magnetic head apparatus according to claim 2, wherein said dead weight is made of a resin.

4. A magnetic head apparatus according to claim 1, wherein said load beam is made of a resin.

5. A magnetic head apparatus according to claim 4, wherein said resin comprises an electrically conductive resin so that it would be in electrical contact with an external member.

6. A magnetic head apparatus according to claim 4, wherein an electrically conductive coating is formed on said resin so that it would be in electrical contact with an external member.

7. A magnetic head apparatus according to claim 1, wherein said head arm has a strengthen plate that is attached to said head arm perpendicularly in such a way that it would not interfere with said recording medium.

8. A magnetic head apparatus comprising:
a load beam to which a floating slider is attached;
a head arm that is supported at a proximal end thereof in such a way as to be pivotable in a radial direction of a recording medium and supports said load beam at a distal end of the load arm;
an elastically deformable member provided on the load beam, so that a floating structure that allows said load beam to swing is formed about said elastically deformable member;
a projecting member for generating a load disposed in the vicinity of said elastically deformable member of said load beam; and
a pressure receiving surface provided on said load beam for receiving a pressure from said projecting member;
wherein, a position of said projecting member for generating a load is adapted to coincide with a center of mass of said load beam and is provided in proximity with a position at which said load beam is supported by said head arm; and
a pressing load of said slider against the recording medium is set by a pressure applied to said pressure receiving surface.

9. A magnetic head apparatus according to claim 8, wherein balancing about said center of mass is attained by means of a dead weight made of a vibration damping member.

10. A magnetic head apparatus according to claim 9, wherein said dead weight is made of a resin.

11. A magnetic head apparatus according to claim 8, wherein said load beam is made of a resin.

12. A magnetic head apparatus according to claim 11, wherein said resin comprises an electrically conductive resin so that it would be in electrical contact with an external member.

13. A magnetic head apparatus according to claim 11, wherein an electrically conductive coating is formed on said resin so that it would be in electrical contact with an external member.

14. A magnetic head apparatus according to claim 8, wherein said head arm has a strengthen plate that is attached to said head arm perpendicularly in such a way that it would not interfere with said recording medium.

15. A magnetic head apparatus comprising:
a head arm that is supported at a proximal end thereof in such a way as to be pivotable in a radial direction of a recording medium;
a base plate adapted to be attached to the head arm;
a load beam that extends from the base plate and is supported by said head arm through said base plate at a distal end of the head arm;
a floating slider attached to said load beam;
an elastically deformable member provided between said base plate and said load beam, so that a floating structure that allows said load beam to swing is formed about said elastically deformable member;
a projecting member for generating a load disposed in the vicinity of said elastically deformable member of said load beam;
a pressure receiving surface provided on said load beam;
wherein, a position of said projecting member for generating a load is adapted to coincide with a center of mass of said load beam and is provided in proximity with a position at which said load beam is supported by said head arm;
a pressing load is applied to a surface of the recording medium via said floating slider; and
a pressing load of said slider against the recording medium is set by a pressure applied to said pressure receiving surface.

16. A magnetic head apparatus according to claim 15, wherein balancing about said center of mass is attained by means of a dead weight made of a vibration damping member.

17. A magnetic head apparatus according to claim 16, wherein said dead weight is made of a resin.

18. A magnetic head apparatus according to claim 15, wherein said load beam is made of a resin.

19. A magnetic head apparatus according to claim 18, wherein said resin comprises an electrically conductive resin so that it would be in electrical contact with an external member.

20. A magnetic head apparatus according to claim 18, wherein an electrically conductive coating is formed on said resin so that it would be in electrical contact with an external member.

21. A magnetic head apparatus according to claim 15, wherein said head arm has a strengthen plate that is attached to said head arm perpendicularly in such a way that it would not interfere with said recording medium.

22. A magnetic head supporting mechanism comprising:
a magnetic head apparatus including a base plate and a load beam extending from the base plate;
a head arm that is supported at a proximal end thereof in such a way as to be pivotable in a radial direction of a recording medium and is attached to said base plate at a distal end of the head arm;
a floating slider attached to said load beam;
an elastically deformable member that is flexible provided between said base plate and said load beam so that a floating structure that allows said load beam to swing is formed about said elastically deformable member; and
a projecting member for generating a load disposed in the vicinity of said elastically deformable member of said load beam, said projecting member for generating a load being provided on said head arm and being adapted to apply a pressure to said load beam;
wherein a position of said projecting member for generating a load is adapted to coincide with a center of mass of said load beam and is provided in proximity with a position at which said load beam is supported by said head arm;
a pressing load is applied to the recording medium via said floating slider; and
said pressing load to the recording medium is set by an amount of rotation of said load beam caused by the pressure applied by said projecting member for generating a load.

23. A magnetic head supporting mechanism according to claim 22, wherein balancing about said center of mass is attained by a dead weight made of a vibration damping member.

24. A magnetic head supporting mechanism according to claim 23, wherein said dead weight is made of a resin.

25. A magnetic head supporting mechanism according to claim 22, wherein said load beam is made of a resin.

26. A magnetic head supporting mechanism according to claim 25, wherein said resin comprises an electrically conductive resin so that it would be in electrical contact with an external member.

27. A magnetic head supporting mechanism according to claim 26, wherein an electrically conductive coating is formed on said resin so that it would be in electrical contact with an external member.

28. A magnetic head supporting mechanism according to claim 22, wherein said head arm has a strengthen plate that is attached to said head arm perpendicularly in such a way that it would not interfere with said recording medium.

29. A magnetic recording apparatus equipped with a magnetic head apparatus according to claim 1.

30. A magnetic recording apparatus equipped with a magnetic head apparatus according to claim 8.

31. A magnetic recording apparatus equipped with a magnetic head apparatus according to claim 15.

32. A magnetic recording apparatus equipped with a magnetic head supporting mechanism according to claim 22.

* * * * *

UNITED STATES PATENT AND TRADEMARK OFFICE
CERTIFICATE OF CORRECTION

| | |
|---|---|
| PATENT NO. | : 7,035,054 B2 |
| APPLICATION NO. | : 10/606787 |
| DATED | : April 25, 2006 |
| INVENTOR(S) | : Honda et al. |

It is certified that error appears in the above-identified patent and that said Letters Patent is hereby corrected as shown below:

On the title page, Item (54), and Column 1, the Title is incorrect. Item (54) and Column 1 should read:

-- (54) MAGNETIC HEAD APPARATUS WITH LOAD BEAM FLOATING STRUCTURE --

Signed and Sealed this

Twenty-fifth Day of July, 2006

JON W. DUDAS
*Director of the United States Patent and Trademark Office*